United States Patent [19]

Park et al.

[11] Patent Number: 5,710,434
[45] Date of Patent: Jan. 20, 1998

[54] ISOCYANATE IMPREGNATING COMPOSITIONS

[75] Inventors: David W. Park, Puyallup; Frank R. Hunter, Bellevue, both of Wash.

[73] Assignee: Weyerhaeuser Company, Tacoma, Wash.

[21] Appl. No.: 715,977

[22] Filed: Sep. 19, 1996

Related U.S. Application Data

[62] Division of Ser. No. 467,498, Jun. 6, 1995, Pat. No. 5,580,922.

[51] Int. Cl.$^6$ .................. C08K 5/05; C08K 5/11
[52] U.S. Cl. .......... 252/182.2; 524/35; 524/311; 524/312; 524/589; 524/733; 524/773; 524/871; 106/12
[58] Field of Search .......... 252/182.2; 524/35, 524/311, 312, 589, 733, 773, 871; 106/12

[56] References Cited

U.S. PATENT DOCUMENTS

| | | | |
|---|---|---|---|
| 4,442,194 | 4/1984 | Mikami | 430/137 |
| 4,478,656 | 10/1984 | Gibson | 149/19.4 |
| 4,536,235 | 8/1985 | Lelu et al. | 149/19.4 |
| 4,707,199 | 11/1987 | Sayles | 149/19.2 |
| 4,977,052 | 12/1990 | Mikami | 430/98 |
| 5,008,359 | 4/1991 | Hunter | 527/103 |
| 5,041,517 | 8/1991 | Vu et al. | 528/60 |
| 5,053,088 | 10/1991 | Sayles | 149/21 |
| 5,130,205 | 7/1992 | Vu et al. | 428/475.5 |
| 5,140,086 | 8/1992 | Hunter et al. | 527/103 |
| 5,220,760 | 6/1993 | Dimakis | 52/309.9 |
| 5,280,097 | 1/1994 | Hunter et al. | 527/103 |
| 5,292,391 | 3/1994 | Wallick | 156/205 |
| 5,332,458 | 7/1994 | Wallick | 156/210 |
| 5,345,738 | 9/1994 | Dimakis | 52/209.9 |
| 5,352,709 | 10/1994 | Tarrant et al. | 521/84.1 |
| 5,580,922 | 12/1996 | Park et al. | 524/733 |

FOREIGN PATENT DOCUMENTS 62-135583  6/1987  Japan.

OTHER PUBLICATIONS

Lévy et al.; "Action de L'isocyanate de phényle sur les Citrates D'éthyle de Méthyle"; Bulletin De La Société Chimique De France; No. 12; 1966; pp. 3956–3959.

*Primary Examiner*—Rabon Sergent

[57] ABSTRACT

The invention is directed to a composition of matter useful as a paper impregnant, to the method of its use, and to the products produced by the method. Poly (diphenylmethane diisocyanate) or PMDI has been used in the past as a paper impregnant with or without propylene carbonate as a diluent. These products have generally required pressing under high pressures and at elevated temperatures. It has now been found that triacetin and/or triethyl citrate in usages up to about 20% of PMDI give superior performance in impregnated products. The modified PMDI will cure at essentially ambient conditions in times as short as 1–2 days to insoluble polyureas with low residual amounts of isocyanates and reaction byproducts such as 4,4'-diaminodiphenylmethane. The treated papers can be used in applications of which skins for sandwich panels and high strength corrugated board would be exemplary.

2 Claims, 5 Drawing Sheets

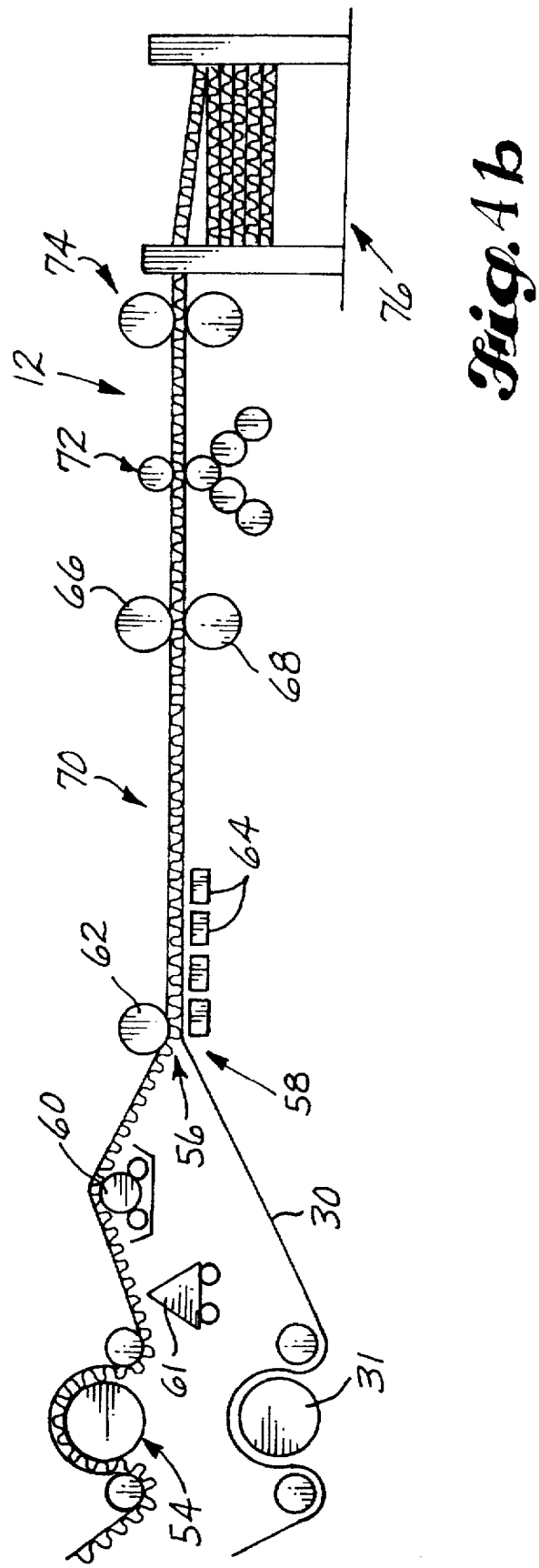

ISOCYANATE IMPREGNATING COMPOSITIONS

This is a divisional of application Ser. No. 08/467,498 filed Jun. 6, 1995 now U.S. Pat. No. 5,580,922.

The present invention is related to a new and useful composition of matter comprising a polyisocyanate in conjunction with triacetin or triethylcitrate. It further comprises cellulosic products impregnated with the composition and the method of their preparation and use.

BACKGROUND OF THE INVENTION

Various paper and similar products have been impregnated with polyisocyanates for uses which include decorative paneling and structural skins of products such as foam or honeycomb filled sandwich panels. Hunter, in U.S. Pat. No. 5,008,359, describes one method of making such products. A sheeted cellulosic paper, such as kraft linerboard, is at least partially impregnated with an essentially uncatalyzed polyfunctional isocyanate. Normally several sheets so impregnated would be superposed and subsequently cured in a press under heat and considerable pressure to form thin panels. Use of any customary catalysts was avoided since they appeared to cause poor adhesion between various plies of the laminates. Preferred pressing temperatures are in excess of 150° C. with pressures of 3000 kPa or greater. Poly(diphenylmethane diisocyanate) (PMDI) appeared to be preferred as the impregnant.

Hunter et at., in U.S. Pat. No. 5,140,086 describe an apparent improvement on the above process. In order to achieve better and more uniform impregnation of the cellulosic substrate the isocyanate is applied in admixture with a miscible organic solvent. Propylene carbonate is the preferred solvent. This was chosen because of its low toxicity, viscosity and vapor pressure at room temperature, its high boiling point of 242° C., and because it is substantially odorless and colorless. A high boiling point material was desirable to prevent blistering during the heat curing operation. In addition to improving impregnation uniformity, propylene carbonate used in a range of 5-20%, gave improved physical properties. It was speculated that the propylene carbonate also may serve as a copolymerizable reactant to some extent. Curing of the product was done under conditions of heat and pressure similar to those described above. However, in the present case it was permissible to include up to 0.5% of a catalyst with the isocyanate-solvent mixture to accelerate the curing reaction.

A later patent to the same inventors, U.S. Pat. No. 5,280,097, is directed to making laminated panel materials in which the earlier products and methods are used as substrates for decorative overlays. The overlay, such as a melamine resin treated printed paper, could be applied to the isocyanate treated substrate or to a laminate formed from a number of substrate plies. These were then preferably cured simultaneously in a single pressing step.

Dimakis, in U.S. Pat. Nos. 5,220,760 and 5,345,738, describes foam filled structural panels made using skins of kraft paper impregnated as taught in one of the above patents.

All of the above noted methods and products require the use of extremely expensive presses for curing the product. However, it has been known that polyisocyanates impregnated into cellulosic substrates will cure to insoluble polymers over prolonged periods of time at ambient conditions. This is believed to be due to slow reaction with the natural moisture present in the substrate, with atmospheric moisture, and possibly by reaction with hydroxyl groups of the cellulosic substrate. PMDI is generally the isocyanate of choice. Wallick, in U.S. Pat. Nos. 5,292,391 and 5,332,458 teaches application of a material such as PMDI to corrugated medium for strength enhancement of corrugated container board without adversely affecting repulpability of the product. The preferred procedure is to apply the isocyanate by spraying after corrugation but prior to application of adhesive at the single facer of the corrugator. Heat curing is thereafter minimized to enhance repulpability. Curing of the isocyanate impregnant continued well after application of the second liner to the product.

PMDI is composed of a wide range of oligomers and varying amounts, typically 40-60% of monomeric 4,4'-diphenylmethane diisocyanate (MDI). As the curing reaction with water occurs under ambient conditions an intermediate reaction product is 4,4'-diaminodiphenylmethane (MDA). This, in turn, again reacts with available —NCO groups to ultimately form insoluble polyureas. MDA is a relatively toxic chemical and it is desirable that its content, as well as the content of residual unreacted MDI, should be as low as possible. Thus it is highly desirable that cure rates should be relatively rapid and that the curing reaction of the PMDI should approach completion with a minimum of unreacted products. If suitably rapid cure rates could be achieved under ambient conditions numerous applications of the polymer impregnated product would present themselves. In the case of flat panels, elimination of the hot pressing step would considerably reduce the cost. The present invention teaches how to achieve such a product by the use of a new composition of matter for impregnating the substrate material.

SUMMARY OF THE INVENTION

The present invention is directed to a new and useful composition of matter which comprises a polyfunctional isocyanate and from 1-20% by weight of triacetin (glyceryl triacetate), triethyl citrate, or mixtures of these two materials. The invention is further directed to a method of impregnating cellulosic fiber products with the composition and to the products so formed. A further aspect of the invention is a corrugated board product formed with at least one of the linerboards or the corrugated medium being treated with the composition. The isocyanate in the treated products will cure to insoluble polyureas without the inclusion of catalysts and under ambient conditions in times as short as two to four days. Quite unexpectedly, inclusion of the triacetin or triethyl citrate with the isocyanate will rapidly reduce undesirable unreacted products such as MDI and MDA to very low levels in the cured treated fiber products.

Triacetin is a particularly desirable product since it is relatively inexpensive and its toxicity is so low that it is an approved food additive.

The actual part that triacetin or triethyl citrate plays in the curing reaction of the polyisocyanate is not well understood. There is no certainty of significant coreaction between these compounds and the polyisocyanate under the conditions employed. Isocyanates are known to be highly reactive with hydroxyl containing compounds, such as water or primary alcohols. This is not the case with esters or tertiary alcohols such as those of the present invention. PMDI, the preferred polyisocyanate of the present invention, is highly hydrophobic at room temperature. While some reaction does occur when it is in direct contact with water at ambient conditions this reaction is slow and largely limited to the immediate interfacial zone at points of contact. The lack of reactivity is undoubtedly due to the phase separation that occurs and to the resulting poor contact between the liquids. The work of Hunter et al., described in U.S. Pat. No. 5,140,086, attempted to deal with the problem by dilution of the PMDI with a solvent that would be mutually compatible with the fiber surface and the isocyanate. The hope was that better fiber wetting should occur with an increase in availability of the moisture within the fiber to the isocyanate as well as better accessibility to hydroxyl groups on the fiber surface. The reasoning was apparently sound since an increase in product physical properties and cure rates was noted. Even so, the improvement was not of large magnitude. When room temperature cures were attempted considerable amounts of MDI and MDA persisted for long periods of time.

Whatever their mode of function, the present inventors have found that triacetin and triethyl titrate, used in conjunction with the polyisocyanate for impregnating cellulosic fiber products, have very significantly and unexpectedly improved cure rates at ambient conditions and greatly reduced the presence and persistence of MDI and MDA. Why these specific compounds perform in superior fashion to other chemically closely related materials is not well understood. While the reason for this is unclear, triacetin and apparently triethyl titrate as well significantly increase the reaction rate of the polyisocyanate with water. Additionally, cellulosic fiber sheets impregnated with 5–30%, preferably 8–20%, of the mixture show improved physical properties at levels that have not heretofore been achieved in prior similar isocyanate modified products.

The term polyisocyanate or polyfunctional isocyanate is defined as those isocyanate compositions that are at least bifunctional in available —NCO groups. In addition to the preferred poly(diphenylmethane diisocyanate) other lower aliphatic, alicyclic or aromatic polyisocyanates, such as tolylene diisocyanate are also believed to be suitable.

It is an object of the present invention to provide new and useful compositions of matter based on polyfunctional isocyanates modified by 1–20% of triacetin, triethyl titrate, or mixtures of these compounds.

It is another object to provide polyfunctional isocyanate compositions useful for impregnation of cellulosic substrates in order to make products of increased strength and rigidity.

It is an additional object to provide impregnated cellulose-based products in which the isocyanate can be cured to insoluble polyurea compounds under ambient conditions without the need for hot pressing.

It is a further object to provide cellulose substrates impregnated with polyfunctional isocyanate compositions that have greatly reduced residual amounts of unreacted monomeric compounds and reaction byproducts.

These and many other objects will become readily apparent to those skilled in the art upon reading the following detailed description in conjunction with the drawings.

BRIEF DESCRIPTION OF THE DRAWINGS

FIGS. 4a and 4b are a diagrammatic representation of a corrugating machine in which the present compositions may be employed.

DETAILED DESCRIPTION OF THE PREFERRED EMBODIMENTS

A modified cellulosic product was made by impregnating sheets of a 33 lb corrugating medium with 16% of the PMDI isocyanate composition using a gravure roll-type coater. By isocyanate composition is meant the totality of the diisocyanate plus any additive material that might be present. Rate measurements in the work to be described were made by following the disappearance of MDI and/or the change in ring crush strength vs. time.

As was noted before, PMDI contains a large number of oligomers and a substantial amount of monomeric MDI. It was assumed that the reaction rate for MDI would adequately represent the overall diisocyanate reaction rate Treated paper samples were stored in a freezer at approximately –20° C. for the short time period between impregnation and the commencement of the rate study. After beginning of the rate study samples were stored at room temperature and 50% relative humidity. For MDI determination approximately 1 g samples of the treated paper were first extracted for 2 hours with dry methylene chloride. Aliquots were filtered through a 0.45 µM pore size filter and derivatized with 1-(2-pyridyl)piperazine prior to analysis. This converts all isocyanate to a urea and provides a stable solution for analysis. Samples were then analyzed using high pressure liquid chromatography (HPLC).

Figure 1:
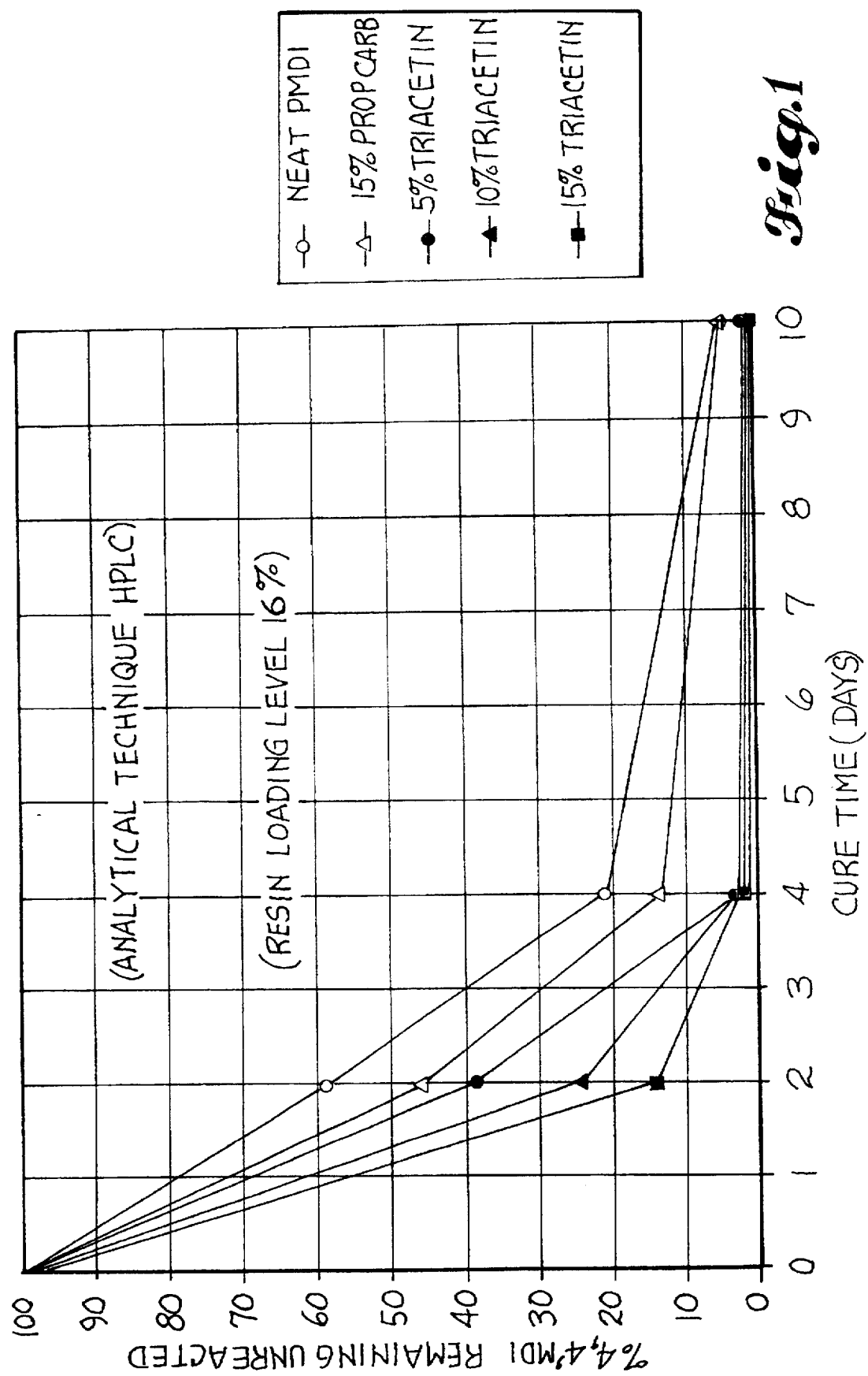
FIG. 1 is a graph showing reaction rate of PMDI with three concentrations of triacetin compared with propylene carbonate and neat PMDI.

FIG. 1 shows disappearance of MDI over time for five different samples. One was impregnated with unmodified (or neat) PMDI. Another used the prior art treatment of a 15% addition of propylene carbonate. The others used 5%, 10%, and 15% additions of triacetin. It will be seen that by four days MDI had dropped to only 2–3% of its original value for all of the triacetin samples. In this same time period MDI in the unmodified sample was still present at a 21% level while that with propylene carbonate had about 14% of the original MDI remaining. Levels of all samples dropped slowly over the next six days of the test period. By 10 days MDI in the triacetin samples was at or below 1% of the original amount present while it was still at about 5% for the other two treatments. It can be assumed that MDA levels in these samples followed those of MDI.

Figure 2:
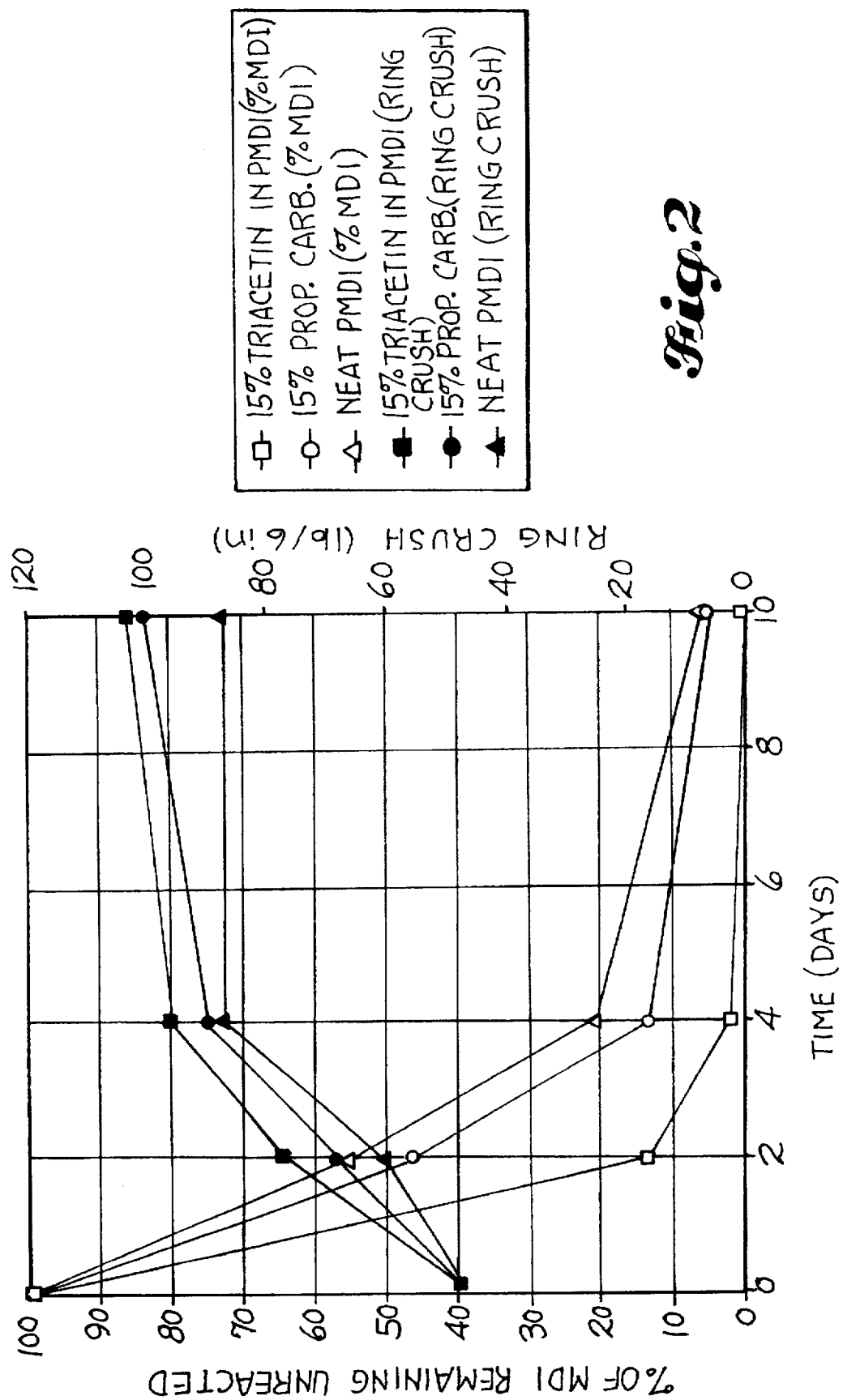
FIG. 2 is a graph similarly showing reaction rate of PMDI with and without triacetin and propylene carbonate and additionally showing ring crush strength of treated papers.

Data for three of these samples is reiterated in FIG. 2 for comparison where development of ring crush strength over time is shown. Ring crush appears to correlate well with the percentage of reacted (or remaining unreacted) MDI. The test is conducted by forming a 12.7 mm by 152.4 mm strip of the paper being tested into a cylinder 49.2 mm in outside diameter. The strip is placed in a grooved holder and top-to-bottom pressure is applied between parallel platens until failure occurs (TAPPI Test Method T 818 om-87). Again, the PMDI with 15% triacetin treated medium proved to be superior in strength development and ultimate strength to PMDI alone or PMDI with 15% propylene carbonate.

Figure 3:
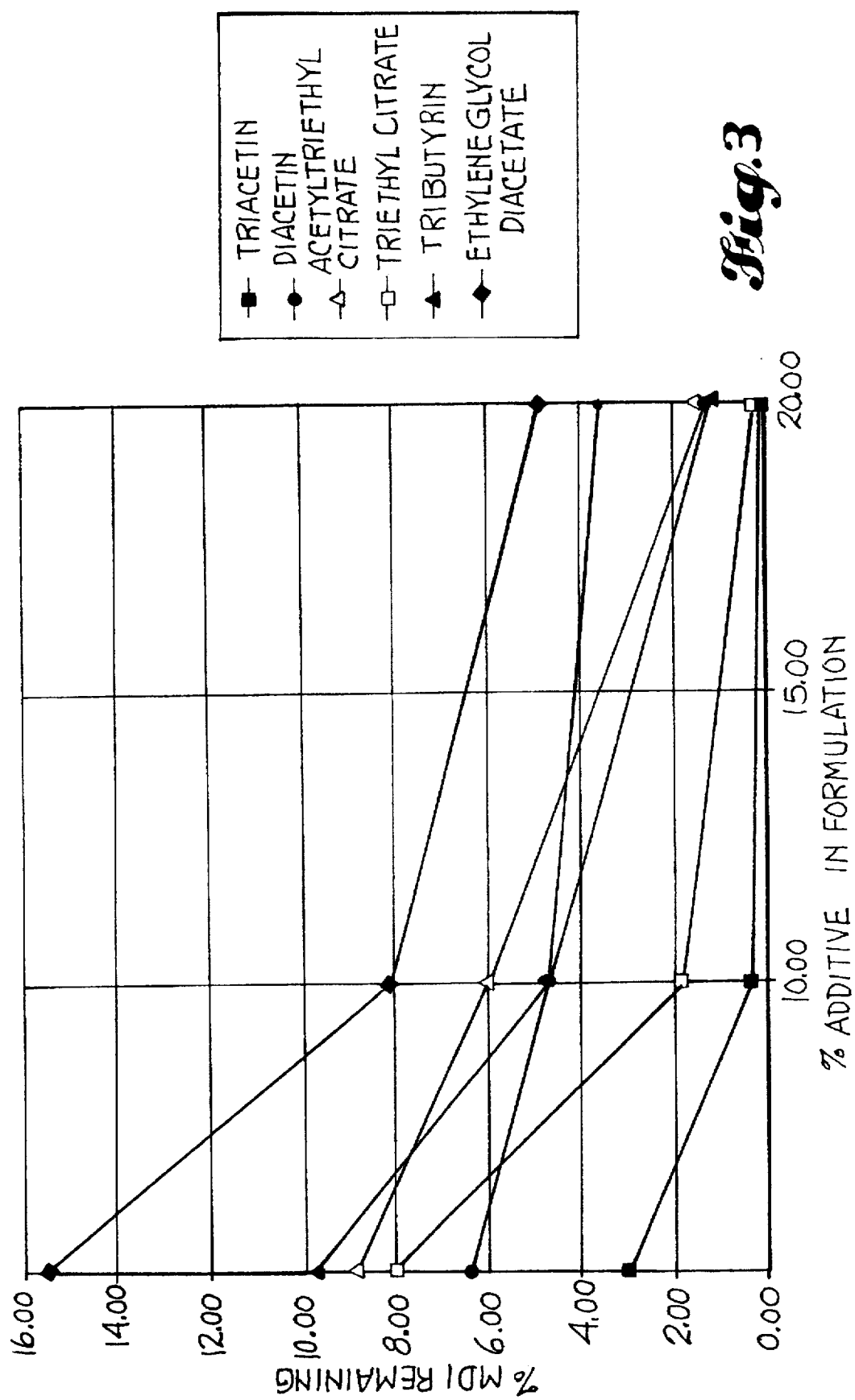
FIG. 3 is a graph showing residual monomer vs. amount of additive after four days for six chemically related materials including triacetin and triethyl citrate.

FIG. 3 compares triacetin and triethyl titrate with a number of chemically analogous compounds: diacetin, acetyltriethylcitrate, tributyrin, and ethylene glycol diacetate. These were impregnated into 33 lb corrugating medium at usages of 5, 10 and 20% and the percentage of original MDI present determined after four days. Triacetin and triethyl citrate were clearly superior to the other materials except for triethyl citrate at the lowest usage. At 20% usage, based on PMDI, both triacetin and triethyl citrate had less than 0.5% of the original MDI remaining. When measured after only two days, triacetin had only 9% and triethyl citrate 12% of the original MDI remaining. Performance was significantly superior to the other compounds tested with them The substrate suitable for treatment may be virtually any cellulosic material in sheeted or thin panel form. Chemical pulps such as bleached or unbleached kraft and sulfite, partially delignified materials including semichemical, or thermomechanical pulps, and groundwood or other mechanically defibered pulps have all proved satisfactory. The product of the invention may be sheeted material that is subsequently stored prior to use, during which time significant or full curing will take place, or it may be further manufactured immediately after treatment. The manufacture of corrugated shipping container products is one example of further manufacture immediately after treatment.

At high application speeds to kraft linerboard using a roll coater there was a tendency for air to be entrapped with the isocyanate composition causing foaming. This was alleviated by the addition of a silicone based antifoamer. A treating composition was made using 88 parts by weight of PAPI 2027, a poly(diphenylmethane diisocyanate) material available from Dow Chemical Co., Midland Mich., and 12 parts triacetin. This was used on a rotary coater using a gravure roll and doctor blade and run with a roll speed of 4.6 m/min. While idling without paper being fed through the coater no foaming was observed. However, on feeding 161 g/m$^2$ kraft liner through the coater heavy foaming was immediately noted. During the next run under similar conditions 0.05% by weight of the isocyanate/triacetin mixture of silicone based Dow Corning Anti-Foam 1400 was added. There was no indication in the coater reservoir of foaming.

EXAMPLE

Figure 4A:
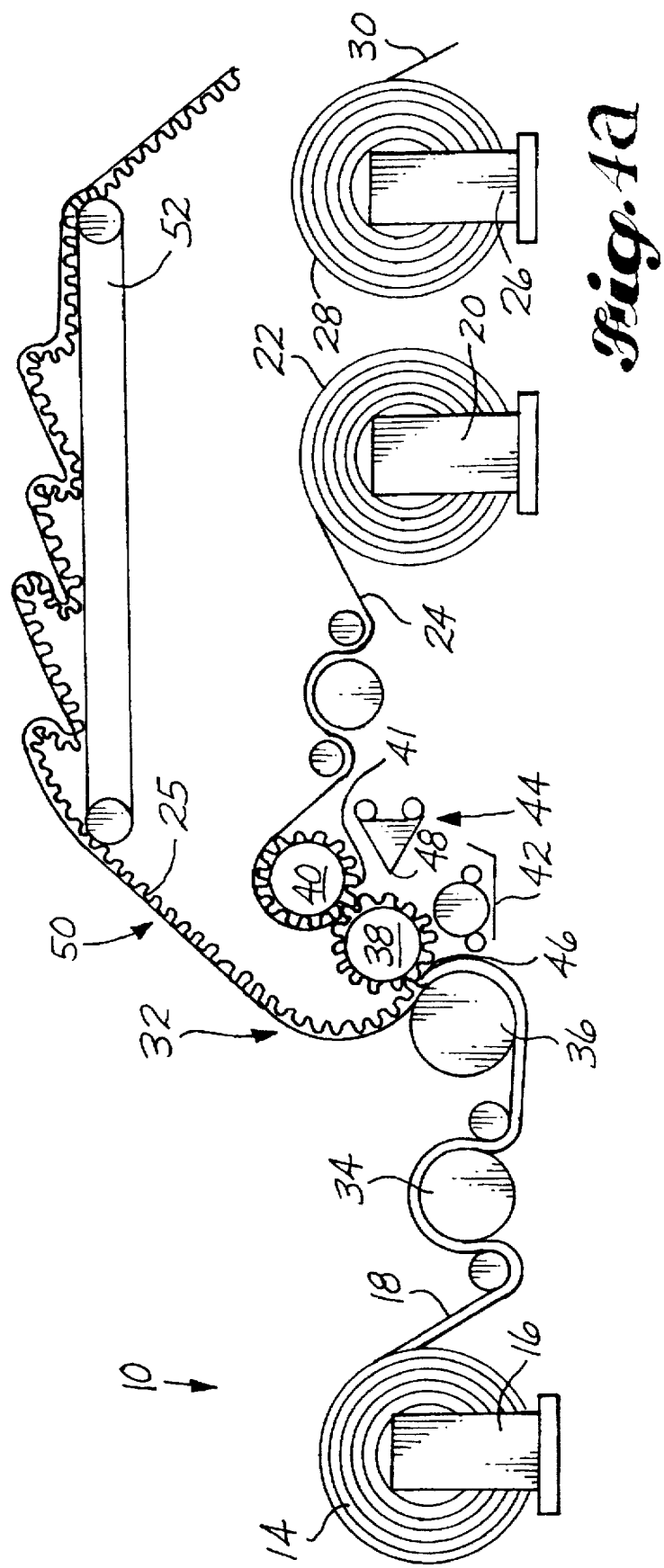

FIGS. 4a and 4b show a schematic representation of an in-line corrugated board manufacturing process including alternative locations where the isocyanate resin composition can be applied to the board. Briefly, an upstream end is indicated at 10 and a downstream end at 12. At the extreme upstream end of the corrugator is a roll of linerboard 14. It is mounted on stand 16 which allows it to be unrolled continuously. The traveling linerboard sheet is indicated throughout the process flow at 18. Shown positioned on stand 20 is a roll of corrugating medium 22. This is unrolled as a sheet 24 which then proceeds through the process. A second liner stand 26 is positioned downstream from medium stand 20 and has a second roll of linerboard 28 mounted thereon. Extending outward from second liner roll 28 is the sheet of traveling liner 30 which begins its downstream travel and passes through a preheater 31 which serves the same function as preheater 34 explained below. Indicated generally at 32 is a single facer station where the first linerboard sheet 18 is bonded to one side of the fluted corrugating medium 25. Just upstream from single facer station 32 is a preheater 34 and pressure roll 36. Preheater 34 serves to heat the traveling first liner 18 in order to aid in gelation of the starch adhesive normally used to adhere the liner to the fluted medium. Pressure roll 36 serves to keep the sheet under proper tension as it travels into the single facer station 32. Adjacent to single facer station 32 is a pair of corrugating rolls 38, 40 which are standard and well known to those skilled in the art and which serve to form flutes in the incoming corrugating medium 24. Where the corrugating rolls 38, 40 mesh at nip 41, medium 24 will be fluted to become corrugated medium 25. Thereafter the fluted medium is carried around roll 40 where at glue applicator 42 it receives a coating of adhesive on the flute tips. Following this, the fluted medium 25 and first liner 18 are combined at nip 46.

In one embodiment of the invention, at a resin application station generally indicated at 44, the isocyanate composition is sprayed or otherwise applied to all or a portion of the surface of the already fluted traveling medium 25. Alternatively the isocyanate composition may be applied to medium 24 prior to corrugation or to the liner sheet 18. As depicted in FIG. 1, immediately after the isocyanate is applied the typical bonding adhesive, usually a starch-based composition, is applied at nip 46. By applying the adhesive following application of the isocyanate resin composition, the adhesive does not interfere with penetration of the resin into the medium.

In some cases it is advantageous to apply the isocyanate following corrugation to prevent any buildup that might otherwise occur on the corrugator.

At resin application station 44, suitable means are provided, such as a sprayer 48, to apply a predetermined mount of the isocyanate composition to the traveling fluted medium. After the resin is applied to the fluted medium and the medium combined with the first liner 18 and bonded thereto, the traveling singlefaced material 50 moves upwardly and across a bridge station 52 and then further in a downstream direction around a tension and drive station 54 (FIG. 1b). Thereafter, second liner 30 travels upwards toward a nip 56 at the double facer station generally shown at 58. Simultaneously, the single faced material 50 travels toward nip 56 and in the process passes glue applicator 60 where adhesive is applied to the flute tips. As another alternative procedure, the isocyanate composition may be applied upstream from adhesive station 60 by applicator 61. Thereafter, the components are combined at double facer station 58 to form a double backed combined board 70 having two liner sheets with the treated fluted corrugated medium sandwiched between them.

Just downstream from nip 56 is a top pressure roll 62 and beneath the corrugated board is a series of hot plates 64 to further enhance the adhesive bond between second liner 30 and the single faced board 50. Downstream pressure rolls 66, 68 apply further light pressure. Following the last hot plate 64 is a cooling section 70. The hot plates typically increase the board temperature to the range of about 93° C. to 120° C. to effect rapid gelation of the starch and evaporation of the water in the adhesive.

Immediately downstream from pressure rolls 66, 68 is a slitting and scoring station 72 and thereafter a cutoff station 74. The flat box blanks are then accumulated on a stacker 76 following which they are ready for further downstream operations which might include application of a manufacturers joint to form a knocked down shipping container.

While in most cases it is preferred to apply the isocyanate composition to the medium, as was noted it may also or alternatively be applied to one or both of the liner sheets.

The inventors have herein disclosed the best mode of operation of their invention as to the time of filing the application. However, it will be readily apparent to those skilled in the art that many variations can be made which are not disclosed herein. These variations should be considered within the scope of the invention insofar as they are included within the encompass of the following claims.

We claim:

1. An impregnating composition for cellulosic materials consisting essentially of a polyisocyanate at least difunctional in —NCO and from 1–20% by weight of the composition of triethyl citrate.

2. The composition of claim 1 wherein the polyisocyanate is poly(diphenylmethane diisocyanate).

* * * * *